No. 630,283. Patented Aug. 1, 1899.
W. BORCHERS.
METHOD OF AND APPARATUS FOR UTILIZING WASTE GASES AND HEAT FROM ELECTRIC FURNACES.
(Application filed Mar. 6, 1899.)
(No Model.) 2 Sheets—Sheet 1.
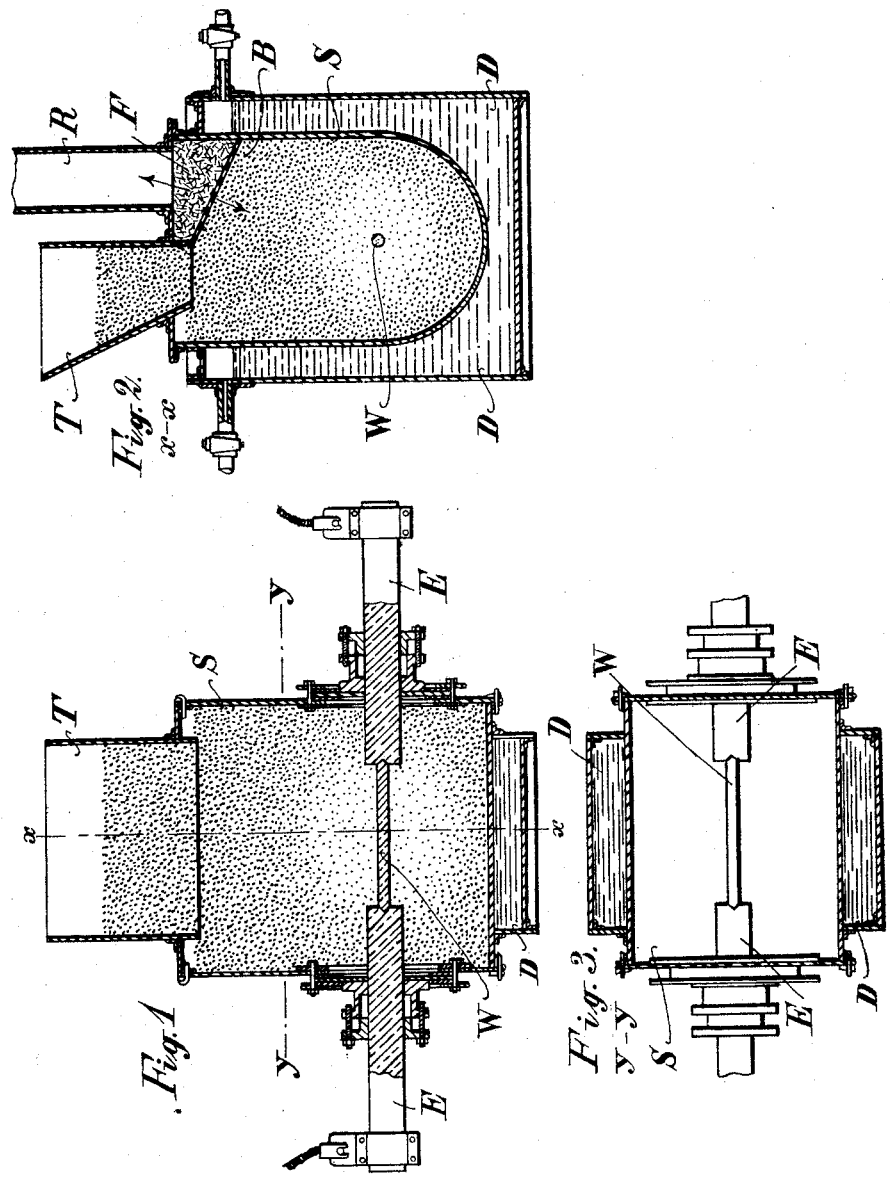

No. 630,283. Patented Aug. 1, 1899.
W. BORCHERS.
METHOD OF AND APPARATUS FOR UTILIZING WASTE GASES AND HEAT FROM ELECTRIC FURNACES.
(Application filed Mar. 6, 1899.)
(No Model.) 2 Sheets—Sheet 2.
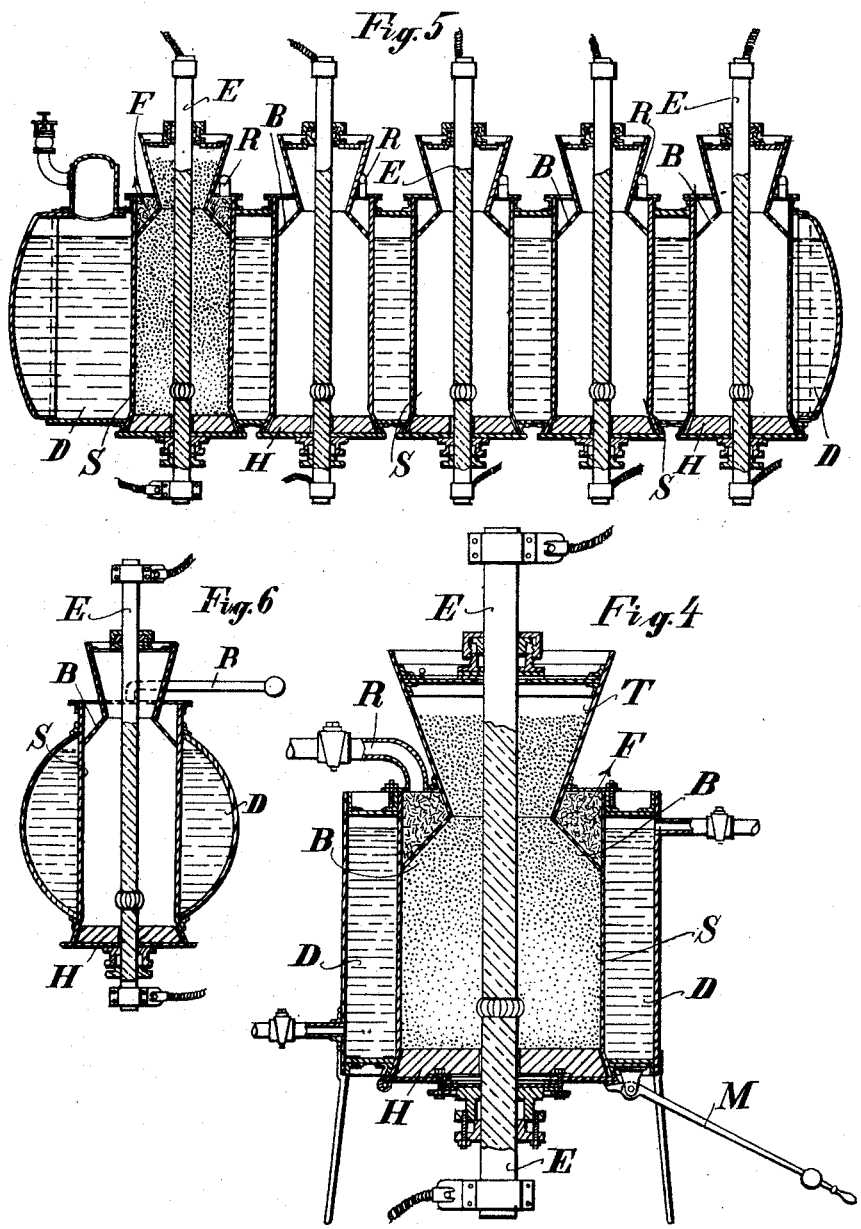

UNITED STATES PATENT OFFICE.

WILHELM BORCHERS, OF AIX-LA-CHAPELLE, GERMANY.

METHOD OF AND APPARATUS FOR UTILIZING WASTE GASES AND HEAT FROM ELECTRIC FURNACES.

SPECIFICATION forming part of Letters Patent No. 630,283, dated August 1, 1899.

Application filed March 6, 1899. Serial No. 708,018. (No model.)

*To all whom it may concern:*

Be it known that I, WILHELM BORCHERS, professor of metallurgy, of 3 Lousbergstrasse, Aix-la-Chapelle, in the German Empire, have invented an Improved Method of and Apparatus for Utilizing the Waste Gases and Heat from Electric Furnaces; and I do hereby declare the nature of this invention and in what manner the same is to be performed to be particularly described and ascertained in and by the following statement, reference being had to the accompanying drawings and to the letters marked thereon.

In the working of electric furnaces, more especially those employed for the manufacture of carbid, attempts are sometimes made to discharge the product from the furnace in a liquid state, for which purpose some furnaces are heated externally in addition to internal electric heating. Other furnaces have been so constructed (and this again applies to the manufacture of carbid) that a given quantity of the carbid is allowed to accumulate in a solidified form within the fusing-chamber in order that the finished block may be subsequently withdrawn from the furnace or allowed to fall therefrom. The importance of carrying out the reaction in electric furnaces by excluding the air and utilizing the evolved waste gases for heating purposes has also been recognized. All furnaces and working methods, however, heretofore known present the following disadvantages: The carbid discharge from the furnace in a heated condition is liable to become partially burned. Portions of the charge fall out of the furnace, together with the discharged carbid blocks, which are of comparatively large bulk, and the carbon in such portions of the charge is consumed, so that when reutilizing such charge fresh carbon must be added thereto, whereby more impurities than necessary find their way from the carbon ashes into the carbid. The gases on leaving the furnace carry off with them a considerable amount of floating dust containing carbon particles, which, being combustible, add the danger of fire to the inconvenience resulting from the floating dust as such. The amount of power consumed in the manufacture of carbid is unduly high notwithstanding previous attempts to reheat the furnaces by burning the waste gases or to heat the charge by the latter.

Now the object of the present invention is to overcome these disadvantages, and for this purpose I employ furnaces, such as illustrated in the accompanying drawings, in which both resistance-heating and arc-heating have proved satisfactory.

Figure 1 represents in vertical section one form of my improved resistance-heating furnace. Fig. 2 is a transverse vertical section of the same, taken on the line $x\ x$ of Fig. 1. Fig. 3 is a horizontal section taken on the line $y\ y$ of Fig. 1. Fig. 4 represents one form of furnace for arc-heating. Figs. 5 and 6 are sectional views hereinafter referred to.

The smelting or fusing chamber S—that is to say, the electric furnace proper, which is formed with thin walls and is provided with a water-jacket D—is arranged inside such jacket after the manner of a furnace in a steam-generator.

In the resistance-heating furnace represented in Fig. 1 the electrodes E are inserted in a suitable manner from opposite sides into the furnace.

In the arc-heating furnace represented in vertical section in Fig. 4 one electrode is inserted vertically through the hopper and the other vertically from below through a hinged bottom or hearth H, capable of turning up or down and when opened allowing the cooled carbid block to be removed from the furnace. This hinged bottom is secured in its closed position by a lever M, provided with a counterweight.

The electrodes E for enabling the current to traverse the charge consist of carbon rods or plates, between which either the heating resistance W, consisting of a solid carbon body or a core of rammed pulverized carbon, is inserted or the said rods or plates may be so arranged that between them a voltaic arc can be struck. (See Figs. 4, 5, and 6.) The said electrodes are properly insulated at the places where they traverse the furnace-walls.

The charge as far as it is not rammed into the furnace and as far as supplementary feeding is necessary is fed from a feed-hopper T, filled with pulverized material to such an extent as to prevent escape of gas.

In the interior of the furnace is an inclined perforated metal plate or diaphragm B, arranged at the natural angle of repose of the surface of the charge. The space above this diaphragm is filled with wood debris or shavings, coarsely-granulated charcoal, or other vegetable or animal fibrous or porous material F, of a similar nature, capable of retaining dust particles. This dust-retaining filter is, in order to prevent its destruction, arranged, as shown, upon those parts of the charge which remain comparatively cool.

From what is generally known about electric furnaces and the method of charging and discharging furnaces of the construction in question no further explanation is necessary.

When the furnace is at work, the gases escaping from the charge (which by preference should not be too finely granulated) pass through the above-mentioned filter in the upper part of the furnace, where the floating dust is retained. Thence the said gases, practically free from dust, pass through a suitably-arranged gas-discharge pipe R into a collecting-receptacle or directly into a feed-pipe, from which they may be taken away for working gas-engines. The size of the furnace and the quantity of the charge are so adjusted that after the carbid block has been entirely fused it will still be inclosed on all sides in sufficiently thick layers of undecomposed charge. Owing to the latter being in contact with the walls (kept cooled by the surrounding water) the said charge remains electrically non-conductive during the whole period of work, so that notwithstanding the metal walls of the furnace the insulation of the electrodes and of the smelting products causes no difficulty. After the working is completed the finished carbid block is left for several hours in the furnace, as owing to the high temperature a considerable amount of heat still remains accumulated therein, which as it gradually passes off may be utilized for the generation of steam. With properly-constructed furnaces the generation of steam commences when one such furnace has been at work for two hours. If, therefore, a series of furnaces of this kind be arranged in one comparatively large steam-boiler, in which one furnace is worked after another successively, and if the carbid blocks be allowed to cool down therein, the generation of steam will go on continuously and may be utilized for the generation of power. A diagrammatic arrangement of this kind is represented in longitudinal section in Fig. 5 and in transverse section in Fig. 6.

The method of cooling the carbid block in the closed furnace apart from the possibility of utilizing the excess of heat offers the further advantage that any undecomposed charge which naturally falls out of the furnace or is withdrawn therefrom, together with the finished carbid block, is so cold that the carbon contained therein is no longer consumed, as was heretofore believed to be unavoidable.

Experiments have proved that by utilizing the waste gases and the excess heat existing in the finished carbid theoretically more than a third—in practice more than a fourth—of the power heretofore used for the manufacture of carbid is saved and that none of the charge becomes covered with or choked by dust; also, that the excess of charging material employed for protecting the furnace-wall admits of being used again at any time without further carbon being added thereto.

Having now particularly described and ascertained the nature of my said invention and in what manner the same is to be performed, I declare that what I claim is—

1. The method of utilizing the waste gases and heat from electric furnaces, consisting in effecting the electric smelting or reduction in the interior of a steam-generator in the presence of an excess of the charge which remains undecomposed, filtering the gases generated in the furnace to free the same from dust particles, and cooling the molten product in the furnace, as set forth.

2. In an electrical furnace, a smelting-chamber provided with an inclined perforated diaphragm at the upper end thereof, and a filtering material located above and supported upon said diaphragm, in that portion of the device which remains comparatively cool, as and for the purpose specified.

3. In a device of the character described, a furnace, a hopper for feeding material thereinto, electrodes extending into said furnace, an inclined perforated diaphragm located in the upper portion of the furnace extending from the bottom of the hopper, and a filtering material of vegetable or animal fibers supported upon said diaphragm, as set forth.

4. The combination with a steam-generator, of a series of electric furnaces arranged therein and each having a filtering device near its upper portion, electrodes in each furnace and connections substantially as described whereby said furnaces may be worked successively, as set forth.

In witness whereof I have hereunto set my hand in presence of two witnesses.

WILHELM BORCHERS.

Witnesses:
  C. E. BRUNDAGE,
  G. SCOTT.